Patented July 27, 1926.

1,593,814

UNITED STATES PATENT OFFICE.

ROBERT VOGEL, OF HAMBURG, GERMANY.

METHOD FOR PRODUCING A SUBSTANCE ADAPTED TO TAMPON WOUNDS.

No Drawing. Application filed February 13, 1925. Serial No. 9,050, and in Germany February 19, 1924.

The tampons used heretofore for wounds caused by accident or by surgical incisions, consisted of fabrics (gauze, charpie or the like), by which the wounds were plugged up. They had the drawback of having to be renewed very often until the healing was completed. Not only did great care have to be observed on every repetition of the plugging of the wound, with regard to sterilization, but this method was also very tedious, took a long time, and was very disagreeable to the patient. Moveover, the tampons, as necessary as they were for the healing process, had the drawback that they were the cause of retarding the final closing of the wound owing to the fact that the wound was mechanically operated upon during their renewal.

The object of the present invention is to produce a substance that can be introduced into the wound in a plastic state where it stiffens or coagulates and is absorbed by the body. Thereby all the drawbacks mentioned above as inherent with the known tampons are eliminated and under certain conditions, moreover, the advantage is gained that the edges of the wounds, without needing to be sewn, can be held together solely by the adhesive power of the tampon.

The invention is based on the discovery that the plasma contained in the blood when prepared in an appropriate way furnishes a tampon substance which fully answers the purpose. The method is carried out by adding to blood freshly drawn from man or beast, certain salts, such as sodium citrate, which delay or prevent the coagulation of the blood in a known manner and to such an extent that the tendency of the blood to coagulate, and the influences which prevent such coagulation, just balance one another, so that the blood is in a state of unstable equilibrium, which state can be disturbed so quickly by deliberately occasioned influences, that a coagulation or stiffening results. Preferably, moreover, the red corpuscles are separated from the blood by centrifugal action, in order to enable bleeding of the wound to be distinguished therefrom by the difference of color of the tampon substance filled into the wound. Furthermore, the liquid constituents of the serum may also be separated so that the plasma remains more or less pure. Of course, in carrying out the method, care must be taken that the material be kept perfectly sterile.

Blood prepared in this manner can be used directly for tamponage, if the state of unstable equilibrium prevailing therein be disturbed shortly before use by the addition of some other salts, as for instance, a few drops of a solution of calcium chloride. If this is done, the blood sets or coagulates shortly after entering the wound and will later be absorbed by it, without having any disturbing effect on the speedy healing process.

Though blood of common animals, owing to its foreign nature, must be considered of less value with regard to its absorbing property in human wounds, than blood of mankind, yet for evident reasons only blood of animals will come into question for the industrial production of the tampon substance. The packing can be carried out either in ampullæ or other vessels that can be closed and which are preferably coated within with a film of paraffine. It is of advantage to add to the packing at the same time a receptacle for the calcium chloride which is to be mixed with the substance just before the tamponing is to be effected, and also two small dishes or bowls, all of which are wrapped in a sterile covering, so that all that is necessary for the tamponing is given to the physician for treating the wound at the very place of the accident or other places where implements or remedies usually present in clinics are not at hand. Even non-professionals can care for themselves if the wounds are not very great.

The substance may also be used for simply plastering or bandaging wounds. Of course disinfecting substances may be added if found convenient.

As germ preventing or germicidal substances particularly eucupinum bihydrochloricum, vuzin and other substances of the same group of quinine derivatives, mentioned in Gehe's Codex III, Ed. 1920, pages 184 and 656, have proved to be very advantageous, since in the necessary concentration they neither injure the cells of the wound nor do they hinder the process of coagulation.

I claim:

1. A method for tamponing wounds, comprising mixing blood with a non-poisonous material which delays its coagulation to such an extent that the blood is approximately in a state of unstable equilibrium with regard to its coagulating quality, adding a material to cause the blood to rapidly coagulate, and prior to its coagulation applying the blood to a wound.

2. A method for tamponing wounds, comprising mixing blood with sodium citrate which delays its coagulation to such an extent that the blood is approximately in a state of unstable equilibrium with regard to its coagulating quality, adding a material to cause the blood to rapidly coagulate, and prior to its coagulation applying the blood to a wound.

3. A method for producing a substance for tamponing wounds, comprising mixing blood freed from red corpuscles with a non-poisonous material which delays its coagulation to such an extent that the blood is approximately in a state of unstable equilibrium with regard to its coagulating quality and then packing the substance in a sterile vessel.

4. A method for producing a substance for tamponing wounds comprising mixing blood free from red corpuscles with a non-poisonous material which delays its coagulation to such an extent that the blood is approximately in a state of unstable equilibrium with regard to its coagulating quality and then packing the substance in ampullæ coated on the inside with paraffine.

5. In a method according to claim 1, including adding a quinine derivative to the blood.

6. In a method according to claim 1, including adding eucupinum bihydrochloricum to the blood.

ROBERT VOGEL.